US008693002B2

(12) United States Patent
Campbell (10) Patent No.: US 8,693,002 B2
(45) Date of Patent: Apr. 8, 2014

(54) FOURIER TRANSFORM SPECTROMETER SYSTEM

(75) Inventor: Joel F. Campbell, Poquoson, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 552 days.

(21) Appl. No.: 12/974,359

(22) Filed: Dec. 21, 2010

(65) Prior Publication Data

US 2012/0013910 A1   Jan. 19, 2012

Related U.S. Application Data (60) Provisional application No. 61/364,482, filed on Jul. 15, 2010.

(51) Int. Cl.
G01J 3/45 (2006.01)

(52) U.S. Cl.
USPC .......................................... 356/451

(58) Field of Classification Search
USPC .......................................... 356/451
See application file for complete search history.

(56) References Cited

U.S. PATENT DOCUMENTS

| | | | |
|---|---|---|---|
| 5,757,488 A * | 5/1998 | Melton et al. | 356/451 |
| 5,914,780 A * | 6/1999 | Turner et al. | 356/451 |
| 7,616,888 B2 | 11/2009 | Mendenhall et al. | |
| 7,995,917 B2 | 8/2011 | Mendenhall et al. | |

OTHER PUBLICATIONS

N.S. Pougatchev et al., Advanced Technologies High Resolution Fourier Transform Spectrometer for Atmospheric Studies, Aerospace Conference Proceedings (IEEE, 2000), pp. 237-243, vol. 3.
James W. Brault, New Approach to High-precision Fourier Transform Spectrometer Design, Applied Optics, Jun. 1, 1996, pp. 2891-2896, vol. 35, No. 16.
Reinhard Beer, Remote Sensing by Fourier Transform Spectrometry, 1992, p. 20, John Wiley & Sons, Inc., United States.
Joel Campbell, Synthetic Quadrature Phase Detector/Demodulator for Fourier Transform Spectrometers, Applied Optics, Dec. 20, 2008, pp. 6889-6894, vol. 47, No. 36.
Dwayne E. Hinton et al., Applications of Advanced Technologies to Space-based Fourier Transform Spectrometers for Atmospheric Remote Sensing, IEEE, 1998, pp. 499-504, vol. 2.
U. Griesmann et al., The NIST FT700 Vacuum Ultraviolet Fourier Transform Spectrometer, Applications In Ultraviolet Spectrometry and Radiometry, SPIE, Jul. 1999, pp. 180-188, vol. 3818.

(Continued)

*Primary Examiner* — Tarifur Chowdhury
*Assistant Examiner* — Jonathon Cook
(74) *Attorney, Agent, or Firm* — Andrea Z. Warmbier; Robin W. Edwards (57) ABSTRACT

A Fourier transform spectrometer (FTS) data acquisition system includes an FTS spectrometer that receives a spectral signal and a laser signal. The system further includes a wideband detector, which is in communication with the FTS spectrometer and receives the spectral signal and laser signal from the FTS spectrometer. The wideband detector produces a composite signal comprising the laser signal and the spectral signal. The system further comprises a converter in communication with the wideband detector to receive and digitize the composite signal. The system further includes a signal processing unit that receives the composite signal from the converter. The signal processing unit further filters the laser signal and the spectral signal from the composite signal and demodulates the laser signal, to produce velocity corrected spectral data.

20 Claims, 7 Drawing Sheets

(56) References Cited

OTHER PUBLICATIONS

S.P. Davis et al., Fourier Transform Spectrometry, (2001),pp. 181-183, Academic Press, United States.

Luca Palchetti et al., Spectral Noise Due to Sampling Errors in Fourier-transform Spectroscopy, Applied Optics, Jul. 1, 2001, pp. 3235-3243, vol. 40, No. 19.

John J. Murray, The GIFTS Satellite Project—Enabling the NAS of the Future With High Resolution Soundings and Imagery, AIAA 41st Aerospace Sciences Meeting and Exhibit, Jan. 6-9, 2003, pp. 1-6, Reno, Nevada, United States.

L. Genzel et al., Tilt-compensated Michelson Interferometer for Fourier Transform Spectroscopy, Applied Optics, Oct. 15, 1978, pp. 3304-3308, vol. 17, No. 20.

E. Fischer, et al., Absolute Interferometric Distance Measurement Using a FM-demodulation Technique, Applied Optics, Sep. 1, 1995, pp. 5589-5594, vol. 34, No. 25.

Yogesh C. Agrawal, Quadrature Demodulation in Laser Doppler Velocimetry, Applied Optics, Jun. 1, 1984, pp. 1685-1686, vol. 23, No. 11.

M. A. Gdeisat at el., Fringe Pattern Demoldulation With a Two-frame Digital Phase-locked Loop Algorithm, Applied Optics, Sep. 10, 2002, pp. 5471-5478, vol. 41, No. 26.

* cited by examiner

FOURIER TRANSFORM SPECTROMETER SYSTEM

CROSS-REFERENCE TO RELATED PATENT APPLICATIONS

This patent application claims priority from U.S. Provisional Patent Application Ser. No. 61/364,482, filed Jul. 15, 2010, the contents of which are hereby incorporated by reference in their entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefor.

BACKGROUND OF THE INVENTION

The present invention relates to a spectrometer sampling system, and more specifically, to frequency demodulated single detector for a Fourier transform spectrometer (FTS) sampling system.

Figure 1:
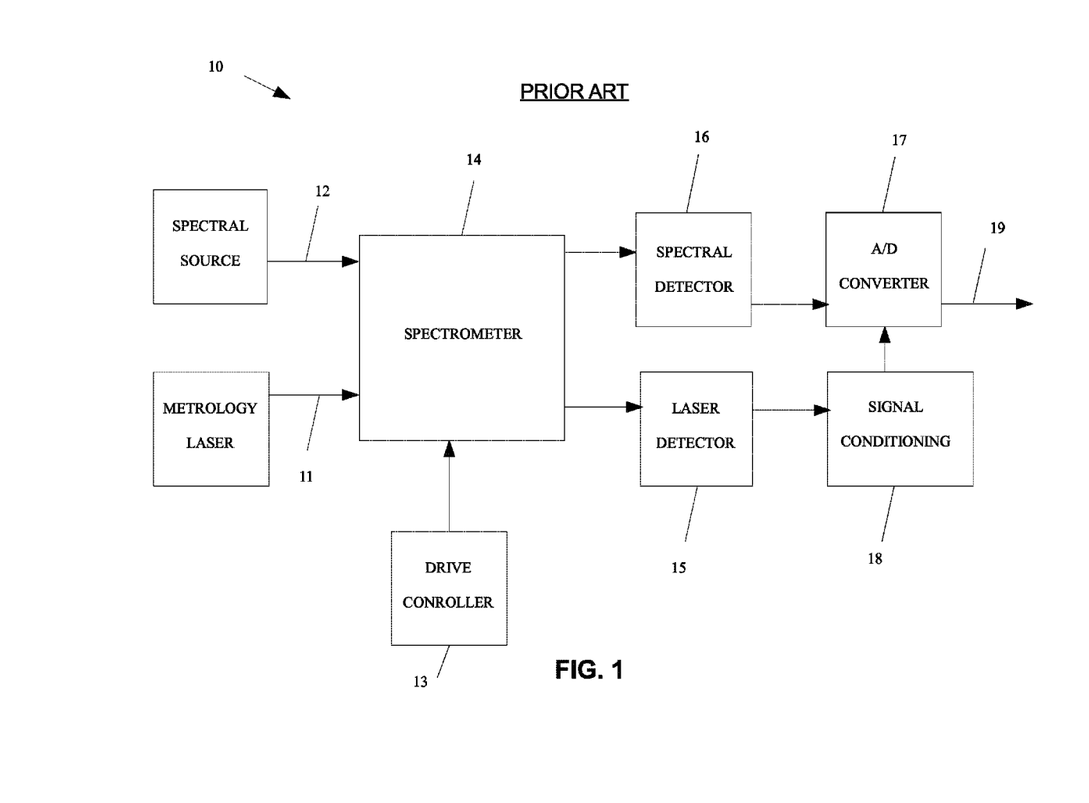
FIG. 1 is a diagram illustrating a FTS data acquisition system.

An FTS may be used by measuring a spectral radiation signal through a Michelson interferometer, for example. As shown in FIG. 1, a FTS data acquisition system 10 for acquiring FTS data from a Michelson interferometer is provided. In FIG. 1, a laser signal 11 and a spectral signal 12 are input into a spectrometer 14 controlled by a drive controller 13. The respective signals 11 and 12 are then guided to separate detectors (i.e., a laser detector 15 and a spectral signal detector 16). The laser signal 11 at the signal conditioner 18 is then input into the A/D converter 17 and used to trigger the A/D converter 17, which in turn outputs the velocity corrected spectral data 19. The Fourier transform of the velocity corrected spectral data 19 may display absorption lines.

Figure 2:
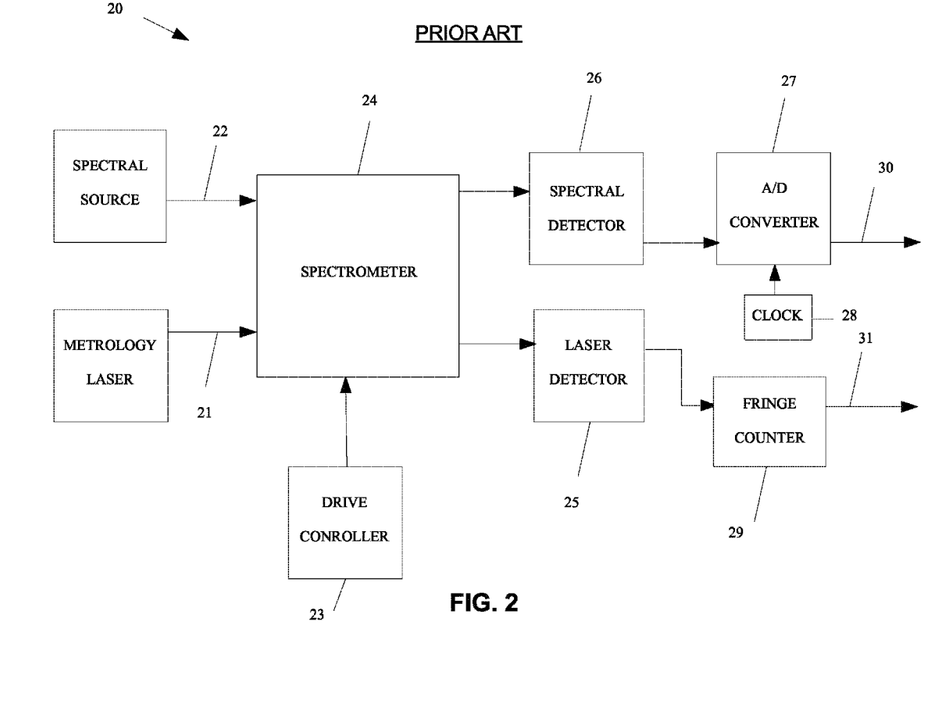
FIG. 2 is a diagram illustrating a FTS data acquisition system.
Figure 3:
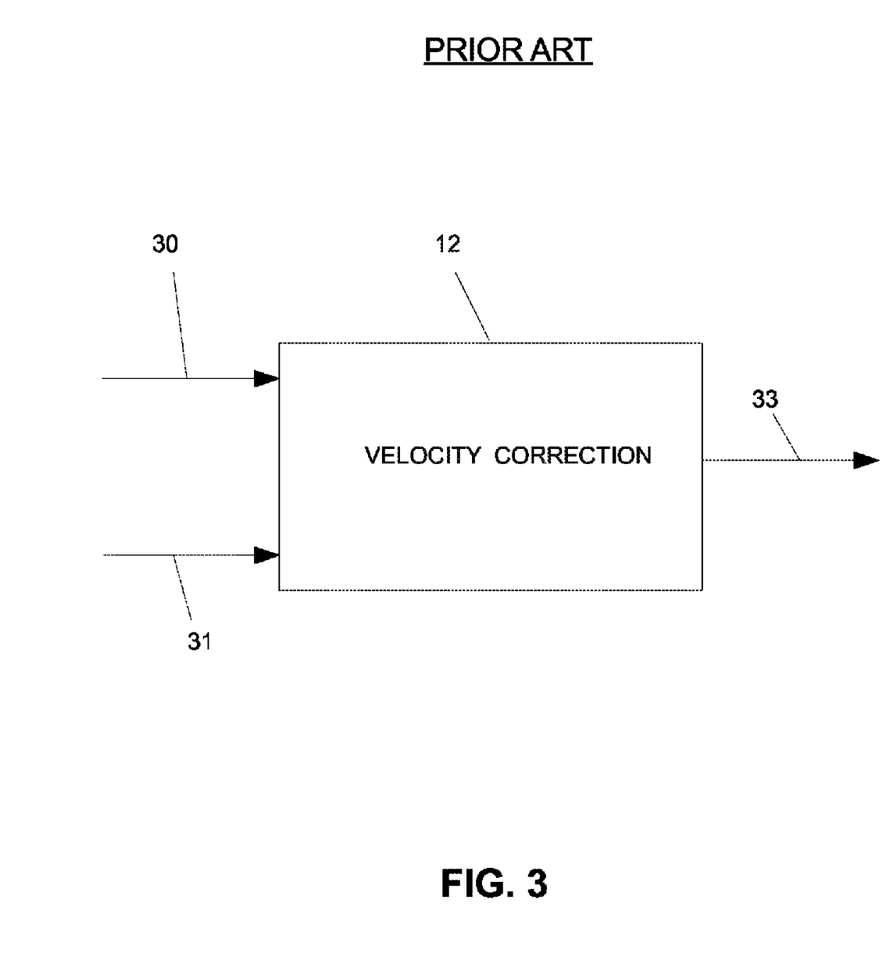
FIG. 3 is a diagram illustrating a velocity correction (i.e., demodulation) process within the FTS data acquisition system shown in FIG. 2.

In another FTS data acquisition system, an A/D converter is triggered by a clock as shown in FIG. 2. FIG. 2 is a diagram illustrating another FTS data acquisition system. As shown in the FTS data acquisition system 20, a laser signal 21 and a spectral signal 22 are supplied to a spectrometer 24 controlled by a drive controller 23. These signals 21 and 22 are separately detected via separate detectors (e.g., a laser detector 25 and a spectral detector 26). The laser signal 21 is guided to the laser detector 25 and instead of triggering an A/D converter 27 directly, it triggers a fringe counter 29 (i.e., an event counter) and the A/D converter 27 is triggered by a clock 28 and outputs uncorrected spectral data 30. Several problems are associated with this system, for example, one issue is non-linear sampling in space. Typically, in an FTS, a reflecting mirror is moved along a slide at constant speed during the scan, however since there may be velocity variations the data needs to be linearized (i.e., re-sampled) with respect to a known reference using a metrology laser, for example. Therefore, after triggering the fringe counter 29, the fringe timing information 31 is then stored to a separate file and used along with the uncorrected spectral data 30 to performed velocity correction calculations (i.e., demodulation (at element 32)) of the uncorrected spectral data 30 during post processing as shown in FIG. 3. The post processing produces velocity corrected spectral data 33. Thus, as shown in system 20 of FIG. 2, there is a need for additional hardware (e.g., the event counter 29), post processing, and tuning for performing velocity correction of the uncorrected spectral data 30.

Therefore, it is desirable to have an FTS data acquisition system capable of obtaining the FTS data while being able to avoid the need for tuning and any additional hardware.

SUMMARY OF THE INVENTION

In one embodiment of the present invention, a FTS data acquisition system including a single detector is provided. According to another embodiment of the present invention, a method for acquiring FTS data from an FTS data acquisition system is provided.

In yet another embodiment, a FTS data acquisition system comprises a FTS spectrometer having a drive controller. The FTS spectrometer, which may comprise a Michelson type spectrometer, is configured to receive a spectral signal and a laser signal. The spectral signal may comprise electromagnetic radiation, including but not limited to, a microwave signal, an infrared signal, visible light, x rays, radio waves or an ultraviolet signal. The system further comprises a wideband detector in communication with the FTS spectrometer, which is configured to receive the spectral signal and laser signal from the FTS spectrometer, and to produce a composite signal from the laser signal and the spectral signal. The system also includes a converter which is in communication with the wideband detector and configured to receive the composite signal and to digitize the composite signal. The wideband detector may also be configured to measure the resulting moving interference fringes and convert the laser signal and spectral signal into an electrical signal and output the composite signal. The system further comprises a signal processing unit which is configured to receive the composite signal from the converter and to perform filtering of the laser signal and the spectral signal and demodulate the laser signal, to produce velocity corrected spectral data. The FTS spectrometer may produces moving interference fringes at the wideband detector. The FTS may also comprise a spectral source and a metrology laser which are in communication with the FTS spectrometer, such that the laser signal is output radiation from the metrology laser, and the spectral signal is output radiation from the spectral source.

The signal processing unit comprises a laser band pass filter which is configured to filter the laser signal from the composite signal, a spectral band pass filter which is configured to filter the spectral signal from the composite signal, and a phase detector in communication with the laser band pass filter. The phase detector includes a first mixer which is in communication with the laser band pass filter and may be configured to receive and combine the laser signal with a first synthetic reference signal to produce a first output signal. The phase detector may also include a second mixer which is in communication with the laser band pass filter and may be configured to receive and combine the laser signal with a second synthetic reference signal to produce a second output signal. The phase detector further includes a first low pass filter and a second low pass filter which are adapted to receive and filter a first and second upper sideband from the first and second output signals to determine a phase thereof. The phase, the first and second output signals, and the spectral signal may be sampled to produce the velocity corrected spectral data. The signal processing unit may be further configured to perform phase tracking of an output signal from the first and second low-pass filters when determined that a phase error thereof is larger than +180° or less than −180°.

The first synthetic reference signal may comprise a first synthetic sin wave frequency, and the laser signal may comprise a laser signal average frequency, wherein the first synthetic sine wave frequency is equal to the laser signal average frequency. The second synthetic reference signal may be 90° out of phase with the first synthetic reference signal.

In yet another embodiment, a method of acquiring Fourier transform spectrometer (FTS) data via an FTS data acquisition system comprises providing a FTS spectrometer; receiving a spectral signal and a laser signal in the FTS spectrometer; providing a wideband detector; inputting the spectral and laser signals into the wideband detector; producing a composite signal comprising the spectral signal and the laser signal; digitizing the composite signal produced; filtering the composite signal; and demodulating the laser signal to produce velocity corrected spectral data. The filtering the composite signal step may comprise: providing a first band pass filter and a second band pass filter; filtering the laser signal from the composite signal with the first band pass filter; and filtering the spectral signal from the composite signal with the second band pass filter. The demodulating the laser signal may comprises: providing a first mixer and a second mixer; mixing the laser signal with a first synthetic reference signal with the first mixer to produce a first mixer output; mixing the laser signal with a second synthetic reference signal with the second mixer to produce a second mixer output; providing a first and second low pass filter; and filtering the first mixer output with the first low pass filter, and filtering the second mixer output with the second low pass filter to determine phase. The method may further include performing phase tracking of an output signal of the first and second low pass filters when it is determined that a phase error thereof is larger than +180° or less than −180°. The method may also include re-sampling an output signal from a distance calculated from the phase error and phase tracking calculations. The method may further comprise re-sampling an output signal from the first and second low pass filters and the spectral signal filter via the second band pass filter, to produce the velocity corrected spectral data. The single wideband detector may be configured to detect spectral and laser frequencies and provide at least a minimal level of sensitivity at the laser frequency in addition to the spectral signal, enhanced through optical filtering of spectral radiation. The method may also include producing moving interference fringes at the FTS spectrometer; and measuring the moving interference fringes, converting that laser signal and spectral signal received into an electrical signal, and outputting the composite signal, via the wideband detector. The spectral signal may comprise electromagnetic radiation, including but not limited to, a microwave signal, an infrared signal, visible light, x rays, radio waves or an ultraviolet signal.

DETAILED DESCRIPTION OF THE INVENTION

Figure 4:
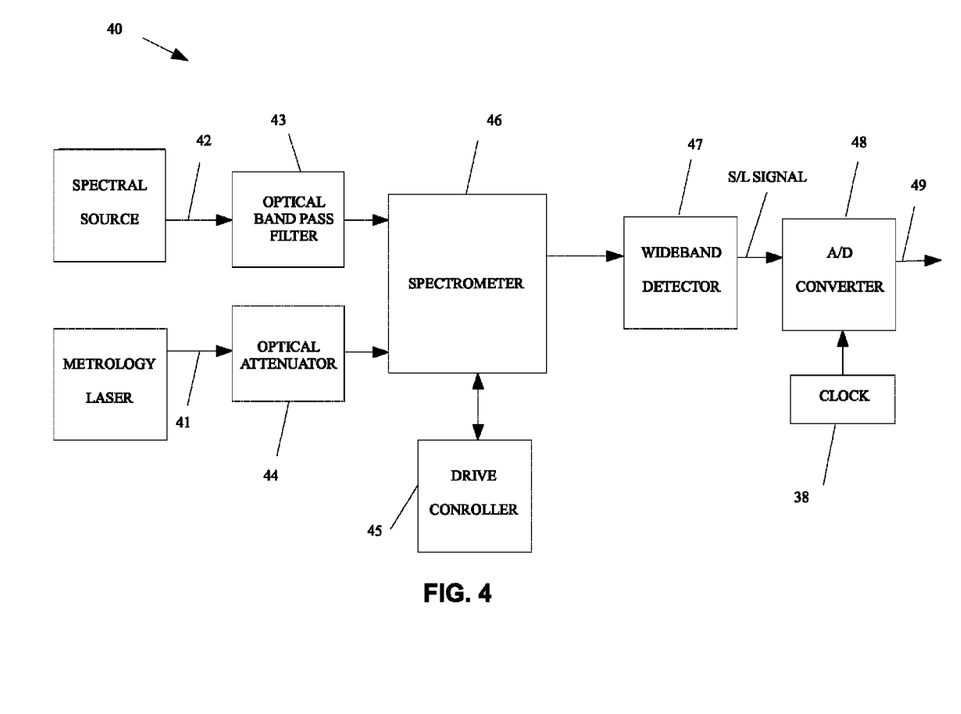
FIG. 4 is a diagram illustrating an FTS data acquisition system having a single detector that can be implemented within embodiments of the present invention.

With reference now to FIG. 4, an FTS data acquisition system using a single detector is provided according to an embodiment of the present invention. In one embodiment of the FTS data acquisition system 40, a laser signal 41 is provided via a metrology laser and a spectral signal 42 is provided via a spectral source. Laser signal 41 is input into an optical attenuator 44, and spectral signal 42 is input into an optical band pass filter 43. Laser signal 41 and spectral signal 42 are then input into an FTS spectrometer 46, which is controlled by a driver controller 45. According to an embodiment of the present invention, the spectral signal 42 may be of any wavelength. The laser signal 41 may also be of any wavelength. According to one embodiment of the present invention, spectral signal 42 may include electromagnetic radiation, including but not limited to, a microwave signal, an infrared signal, visible light, x rays, radio waves or an ultraviolet signal. However the present invention is not limited hereto.

According to an embodiment of the present invention, the FTS spectrometer 46 may be a Michelson spectrometer, or a Michelson interferometer, that produces fringe movement with the movement of a movable carriage (not shown). The drive controller 45 of the FTS spectrometer 46 may be any type of drive system. According to an embodiment of the present invention, any spectrometer and associated drive controller suitable for the purpose set forth herein may be utilized.

Further, as shown in FIG. 4, the laser signal 41 and the spectral signal 42 are output from the FTS spectrometer 46 and input into a single wideband detector 47. According to an embodiment of the present invention, the wideband detector may be any range provided it has at least a minimal level of sensitivity at the laser wavelength. The minimum sensitivity would be that required to measure the sinusoidal variations of the laser fringes. The ability to do this may be enhanced by using the optical band pass filter 43 in the spectral radiation path and the optical attenuator 44 in the laser radiation path to minimize interference between the laser and spectral wavelengths. In an alternative embodiment, the optical band pass filter 43 and the optical attenuator 44 may be implemented before or after the FTS spectrometer 46 or incorporated therein.

Also shown in FIG. 4, the wideband detector 47 produces a single composite (Spectral/Laser) signal. This Spectral/Laser signal is digitized via an A/D converter 48, which is triggered by a clock 38, to output a digitized (Spectral/Laser) composite signal 49. The composite signal 49 is then digitally filtered into separate bands according to an embodiment of the present invention.

Figure 5:
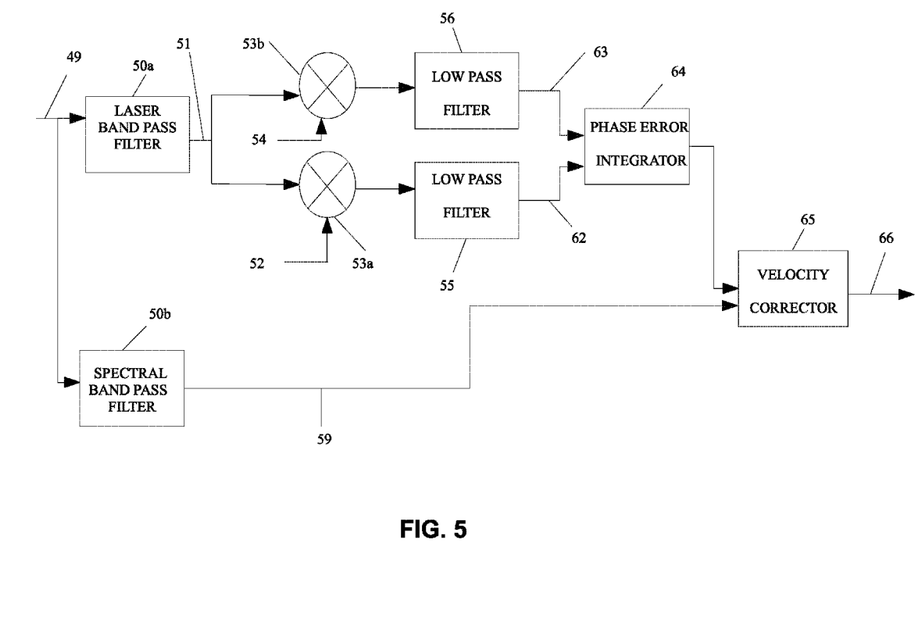
FIG. 5 is a diagram illustrating a signal filtering process and velocity correction (i.e., demodulation) process within the FTS data acquisition system shown in FIG. 4 that can be implemented within embodiments of the present invention.

FIG. 5 shows a signal filtering process and velocity correction (i.e., demodulation) process within the FTS data acquisition system 40. As shown in FIG. 5, a signal processing unit 60 includes separate band pass filters for the laser signal (i.e., laser band pass filter (LBPF) 50a) and the spectral signal (i.e., spectral signal band pass filter (SBPF) 50b). Alternatively, the functions within the signal processing unit 60 may be implemented via software means. The LBPF 50a filters and outputs a laser signal data 51 of the composite signal 49, and the SBPF 50b filters and outputs a spectral signal data 59 of the composite signal 49.

According to an embodiment of the present invention, the laser signal data 51 is decoded to provide velocity error correction. According to one embodiment of the present invention, demodulation of the laser signal data 51 may be performed by using a quadrature phase detector 61 as shown. A phase detector is a device that multiplies/mixes a reference signal and generates a signal that is proportional to the phase difference between the signals. The quadrature phase detector 61 includes first and second mixers 53a and 53b and mixes the laser signal data 51 with first and second synthetic reference signals 52 and 54. The quadrature phase detector 61 enables the detection of a phase difference of ±180°. The use of the quadrature phase detector 61 (e.g. a synthetic quadrature phase detector) enables the determination a position at each sample point with the application of phase tracking so that the position may be determined beyond ±180°. Therefore, the present invention provides an advantage of being able to build a more robust system with any laser reference and correct for higher frequency velocity variations.

According to the current embodiment of the present invention, the laser signal 51 is in a time domain as follows:

$$S(t)=A(t)\sin(2\pi f(t)t+\Phi), \text{ where } \Phi \text{ is the initial arbitrary phase.}$$

$A(t)$ represents amplitude, which is assumed to be a slowly changing function. Any misalignment or vibration may cause the amplitude to change with time. Also, $f(t)$ represents frequency, which is also a slowly changing function. Any variation in scan velocity may cause the frequency to change with time. Thus, in order to demodulate the laser signal data 51, the laser signal data 51 and the first synthetic reference signal 52 are combined at the first mixer 53a, and the laser signal data 51 and the second synthetic reference signal 54 are combined at the second mixer 53b.

According to an embodiment of the present invention, the first synthetic reference signal 52 is a synthetic sine wave having a frequency equal to an average frequency of the laser signal 51 and the second synthetic reference signal 54 is 90° out of phase with the first reference signal 52. As discussed above, a single frequency may be used. Alternatively, a frequency follower situation may be implemented, whereby the first and second synthetic reference signals 52 and 54 may be chosen to follow the laser frequency in situations where the velocity variations are very large. According to one embodiment of the present invention, the first and second synthetic reference signals (52 and 54) may be produced via software means or they may be created synthetically in hardware. According to an embodiment of the present invention, the first reference signal 52 is equal to $\sin(2\pi f_a t)$, where $f_a$ is the average laser fringe frequency. After passing through mixer 53a in combination with the laser signal data 51 the first synthetic reference signal 52 becomes $S_1(t)=A(t)\sin(2\pi f(t)t+\phi)\sin(2\pi f_a t)$ which comprises an upper sideband and a lower sideband. The upper sideband is then filtered via a low-pass filter 55 with the result:

$$S_1' = \frac{A(t)}{2}\cos(2\pi(f(t)-f_a)t+\phi).$$

The result is the cosine of the phase error times the amplitude modulation (resultant data signal 62).

The second synthetic reference signal 54 is equal to $\cos(2\pi f_a t)$. The laser signal 51 is then combined with the second synthetic reference signal 54 at the mixer 53b and, the result is $S_2(t)=A(t)\sin(2\pi f(t)t+\phi)\cos(2\pi f_a t)$. The upper sideband of this signal is also filtered out via a low-pass filter 56 giving the cosine of the phase error times the amplitude modulation (resultant data signal 63), $$S_2' = \frac{A(t)}{2}\sin(2\pi(f(t)-f_a)t+\phi).$$

By dividing $S_2'$ by $S_1'$, it is found that $S_2'/S_1'=\tan(2\pi(f(t)-f_a)t+\phi)$. As a result, any amplitude modulation is removed. By the above equation, according to an embodiment of the present invention, the phase may be determined to within ±180°. If it is determined that the phase error is larger than +180° or less than −180°, phase tracking is required. This is determined by tracking sudden jumps in the phase. At a phase tracking phase error integrator 64, the phase tracking operation is used to determine a FTS slide position as a function of fringe number. According to an embodiment of the present invention, a table of spectral data points versus position in terms of laser fringe number (which is calculated to a fraction of a fringe, for example) is used. The distance between one sample point to the next is:

$$d_{n+1} - d_n = f_a \Delta t + \frac{1}{2\pi}\arctan\left(\frac{S_2'(t_{n+1})}{S_1'(t_{n+1})}\right) - \frac{1}{2\pi}\arctan\left(\frac{S_2'(t_n)}{S_1'(t_n)}\right) \pm j$$

Where $j$ is the integer that is used for the phase tracking when necessary. If $j$ is set to 0 this difference will be small except where sudden jump in phase. The phase tracking is performed by tracking any sudden jumps, and then selecting $j$ for the smallest possible change. This is then paired with the amplitude of the spectral signal at those same sample points. Using interpolation, the data is re-sampled linearly with distance, which velocity corrects (i.e., demodulates) the data (at a velocity corrector 65).

According to an embodiment of the present invention, since the laser signal and the spectral signal are synchronous, performance of a tuning operation may not be necessary, but can be performed if desired.

According to an alternative embodiment of the present invention, demodulation of the laser signal data 51 may be performed by interpolating the laser signal data 51 in such a way that zero crossings are found. Therefore, fringe timing information may be determined and velocity correction may be performed.

Figure 6:
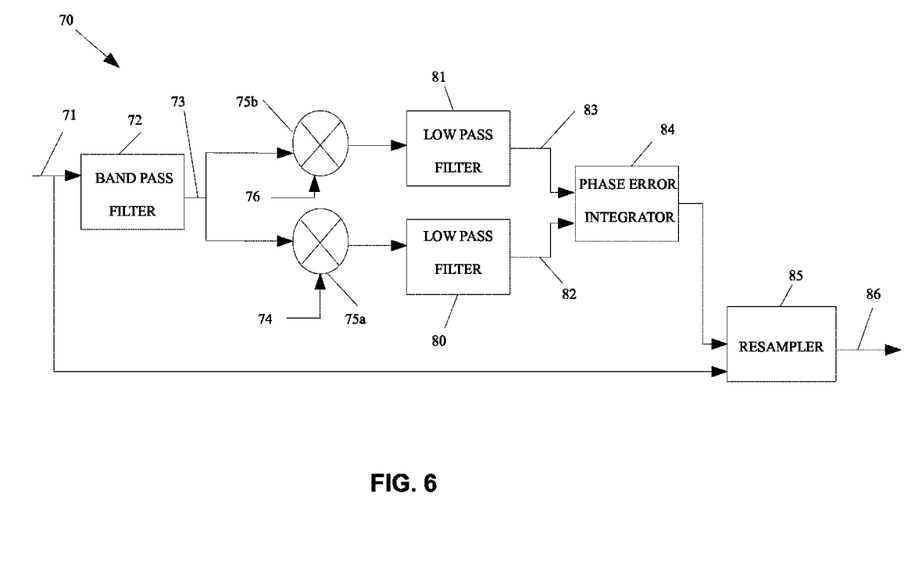
FIG. 6 is a diagram illustrating another embodiment of an FTS data acquisition system.

According to another embodiment of the present invention, the above mentioned demodulation operation may be applied to data already taken from another system by finding a signal lock on an absorption line and demodulating it as a method for spectrum image enhancement as shown in FIG. 6. FIG. 6 is a diagram illustrating another embodiment of an FTS data acquisition system 70. As shown in FIG. 6, spectral data 71 is input and an isolated line is determined at a bandpass filter 72. Also, at the bandpass filter 72, a band pass filter is then applied, thereby producing a pseudo laser signal 73. The pseudo laser signal 73 is then demodulated using first and second synthetic reference signals 74 and 76, which may be similar to the first and second synthetic reference signals 52 and 54 shown in FIG. 5. According to an embodiment of the present invention, the synthetic reference signals 74 and 76 are based on the wavelength of the line. The demodulation of the pseudo laser signal 73 may comprise the same process as that of the laser signal data 51 shown in FIG. 5. That is, the pseudo laser signal 73 may be mixed with the first synthetic reference signal 74 at mixer 75a, and the pseudo laser signal 73 may be mixed with the second synthetic reference signal 76 at mixer 75b. The results are filtered via low pass filters 80 and 81 respectively and the filtered resultant data 82 and 83 is then used to perform phase tracking (at a phase tracking phase error integrator 84) when necessary. Using interpolation, the data is re-sampled linearly with distance, which velocity corrects (i.e., demodulates) the data (at a resampler 85), thereby producing corrected spectral data 86.

According to another embodiment of the application, the same may be applied to sharpen absorption lines by doing a virtual velocity correction against a perfect virtual sinusoidal synthetic signal.

Figure 7:
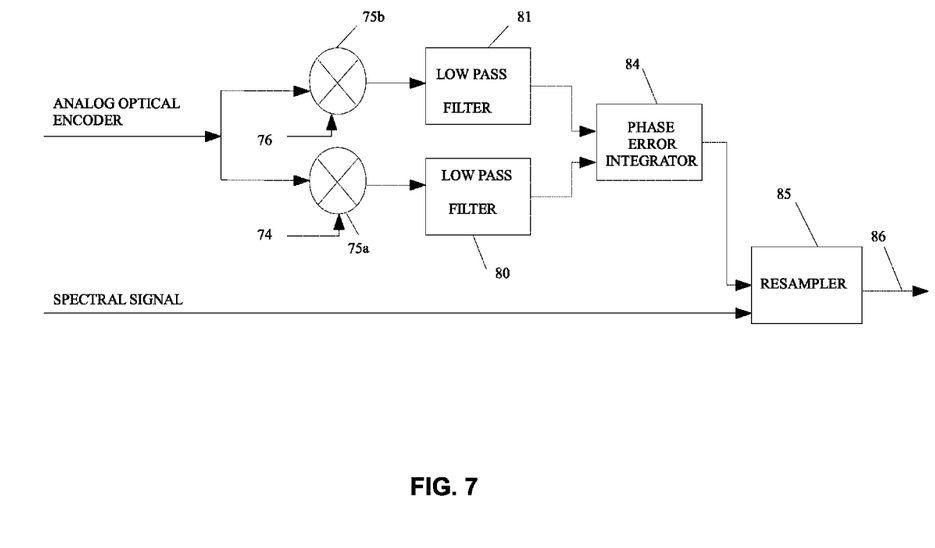
FIG. 7 is a diagram illustrating another embodiment of an FTS data acquisition system.

Additionally, as shown in FIG. 7, in an alternative embodiment, an analog optical encoder (not shown) may be used instead of a metrology laser. The spectral signal may comprise electromagnetic radiation, including but not limited to, a microwave signal, an infrared signal, visible light, x rays, radio waves or an ultraviolet signal.

Embodiments of the present invention provide the use of a synthetic quadrature phase detector and phase tracker to determine an FTS slide position for each digitized point. Further, the embodiments of the present invention provide a single detector and use of the software-based quadrature phase detector/demodulator technique combined with digital filtering to decode and separate distance information from the spectral data. Therefore, external triggering of an event counter, for example, is unnecessary and electronic phase errors are minimized. Also, the use of the signal detector makes the laser signal and spectral data synchronous therefore tuning may not be required, but can be performed if deemed necessary.

While preferred embodiments and example configurations of the invention have been herein illustrated, shown and described, it is to be appreciated that various changes, rearrangements and modifications may be made therein, without departing from the scope of the invention as defined by the appended claims. It is intended that the specific embodiments and configurations disclosed are illustrative of the preferred and best modes for practicing the invention, and should not be interpreted as limitations on the scope of the invention as defined by the appended claims and it is to be appreciated that various changes, rearrangements and modifications may be made therein, without departing from the scope of the invention as defined by the appended claims.

What is claimed is:

1. A Fourier transform spectrometer (FTS) data acquisition system comprising:
    a FTS spectrometer comprising a drive controller, the FTS spectrometer configured to receive a spectral signal and a laser signal;
    a wideband detector in communication with the FTS spectrometer and configured to receive the spectral signal and laser signal from the FTS spectrometer, and to produce a composite signal from the laser signal and the spectral signal;
    an analog to digital (A/D) converter in communication with the wideband detector and configured to receive the composite signal and to digitize the composite signal; and
    a signal processing unit configured to receive the composite signal from the converter and to perform filtering of the laser signal and the spectral signal and demodulate the laser signal, to produce velocity corrected spectral data.

2. The FTS data acquisition system of claim 1, wherein the FTS spectrometer is a Michelson type spectrometer.

3. The FTS data acquisition system of claim 1, wherein the FTS spectrometer produces moving interference fringes at the wideband detector.

4. The FTS data acquisition system of claim 3, wherein the signal processing unit comprises:
    a laser band pass filter configured to filter the laser signal from the composite signal;
    a spectral band pass filter configured to filter the spectral signal from the composite signal;
    a phase detector in communication with the laser band pass filter, the phase detector comprising:
        a first mixer in communication with the laser band pass filter and configured to receive and combine the laser signal with a first synthetic reference signal to produce a first output signal,
        a second mixer in communication with the laser band pass filter and configured to receive and combine the laser signal with a second synthetic reference signal to produce a second output signal, and
        a first low pass filter and a second low pass filter adapted to receive and filter a first and second upper sideband from the first and second output signals to determine a phase thereof,
    wherein using the phase, the first and second output signals, and the spectral signal are sampled to produce the velocity corrected spectral data.

5. The FTS data acquisition system of claim 4, the first synthetic reference signal comprising a first synthetic sin wave frequency, and the laser signal having a laser signal average frequency, wherein the first synthetic sine wave frequency is equal to the laser signal average frequency, and wherein the second synthetic reference signal is 90° out of phase with the first synthetic reference signal.

6. The FTS data acquisition system of claim 5, wherein the signal processing unit is further configured to perform phase tracking of an output signal from the first and second low-pass filters when determined that a phase error thereof is larger than +180° or less than 180°.

7. The FTS data acquisition system of claim 6, further comprising a spectral source and a metrology laser in communication with the FTS spectrometer, wherein the laser signal is output radiation from the metrology laser, and the spectral signal is output radiation from the spectral source.

8. The FTS data acquisition system of claim 5, wherein the wideband detector is configured to measure the resulting moving interference fringes and convert the laser signal and spectral signal into an electrical signal and output the composite signal.

9. The FTS data acquisition system of claim 8, wherein the spectral signal comprises a microwave signal, an infrared signal, visible light, x rays, radio waves, or an ultraviolet signal.

10. A method of acquiring Fourier transform spectrometer (FTS) data via an FTS data acquisition system, the method comprises:
    providing an FTS spectrometer, an optical attenuator, and an optical band pass filter;
    receiving a spectral signal from a spectral source and a laser signal from a metrology laser into the FTS spectrometer via the optical attenuator and the optical band pass filter, respectively, wherein the spectral signal is selected from the group consisting of a microwave signal, an infrared signal, visible light and an ultraviolet signal;
    providing a single wideband detector;
    inputting the spectral signal and the laser signal into the single wideband detector via the FTS spectrometer;
    producing a composite signal comprising the spectral signal and the laser signal via the wideband detector;
    digitizing the produced composite signal via an analog to digital (A/D) converter;
    filtering the composite signal; and demodulating the laser signal to produce velocity corrected spectral data.

11. The method of claim 10, wherein filtering the composite signal comprises:
providing a first band pass filter and a second band pass filter;
filtering the laser signal from the composite signal with the first band pass filter; and
filtering the spectral signal from the composite signal with the second band pass filter.

12. The method of claim 11, wherein demodulating the laser signal comprises:
providing a first mixer and a second mixer;
mixing the laser signal with a first synthetic reference signal with the first mixer to produce a first mixer output;
mixing the laser signal with a second synthetic reference signal with the second mixer to produce a second mixer output;
providing a first and second low pass filter; and
filtering the first mixer output with the first low pass filter, and filtering the second mixer output with the second low pass filter to determine phase.

13. The method of claim 12, wherein the first synthetic reference signal comprises a first synthetic sine wave frequency, and the laser signal comprising a laser signal average frequency, and wherein the first synthetic sine wave frequency is equal to the laser signal average frequency.

14. The method of claim 13, further comprising:
performing phase tracking of an output signal of the first and second low pass filters when determined that a phase error thereof is larger than +180° or less than 180°.

15. The method of claim 14, further comprising:
re-sampling an output signal from a distance calculated from the phase error and phase tracking calculations.

16. The method of claim 14, further comprising:
re-sampling an output signal from the first and second low pass filters and the spectral signal filter via the second band pass filter, to produce the velocity corrected spectral data.

17. The method of claim 12, wherein the single wideband detector is configured to detect spectral and laser frequencies and provides at least a minimal level of sensitivity at the laser frequency in addition to the spectral signal, enhanced through optical filtering of spectral radiation.

18. The method of claim 12, further providing the spectral source and the metrology laser in communication with the FTS spectrometer, wherein the laser signal is output radiation from the metrology laser, and the spectral signal is output radiation from the spectral source.

19. The method of claim 10, further comprising:
producing moving interference fringes at the FTS spectrometer; and
measuring the moving interference fringes, converting the received laser signal and the received spectral signal received into an electrical signal, and outputting the composite S/L signal, via the single wideband detector.

20. A method comprising:
receiving a spectral signal and a laser signal via a Michelson type Fourier transform spectrometer;
receiving the spectral signal and the laser signal from the spectrometer via a single wideband detector that is in communication with the spectrometer;
producing a composite signal from the laser signal and the spectral signal using the single wideband detector;
digitizing the composite signal via an analog to digital (A/D) converter in communication with the single wideband detector;
receiving the digitized composite signal from the A/D converter via a signal processing unit;
filtering the digitized composite signal into the laser signal and the spectral signal via a signal processing unit; and
demodulating the laser signal to thereby produce velocity corrected spectral data.

* * * * *